United States Patent [19]

Lacroix et al.

[11] Patent Number: 4,677,644
[45] Date of Patent: Jun. 30, 1987

[54] METHOD AND APPARATUS FOR REMOTE SIGNALLING BY SUBSTITUTING A MESSAGE FOR THE DATA CONVEYED BY A DIGITAL TRANSMISSION LINK

[75] Inventors: Jean-Claude Lacroix, Bruyeres le Chatel; Pierre Franco, Fresnes; Stéphane Le Gall, Sceaux; Gérard Bourret, La Ville du Bois; Jacques Pochet, Le Plessis Pate, all of France

[73] Assignee: Compagnie Industrielle des Telecommunications CIT-Alcatel, Paris, France

[21] Appl. No.: 802,392

[22] Filed: Nov. 27, 1985

[30] Foreign Application Priority Data

Nov. 30, 1984 [FR] France .................. 84 18319

[51] Int. Cl.⁴ .......................................... H04L 5/22
[52] U.S. Cl. ...................... 375/5; 370/111; 340/825.62
[58] Field of Search ............ 375/5, 37; 370/21, 110.1, 370/110.2, 111; 340/825.16, 825.57, 825.6, 825.62; 178/71 R, 71 T

[56] References Cited

U.S. PATENT DOCUMENTS

| 2,997,638 | 8/1961 | Brittain | 340/825.62 |
| 3,518,547 | 6/1970 | Filipowsky | 370/21 |
| 4,406,919 | 9/1983 | Pospischil | 178/71 T |

FOREIGN PATENT DOCUMENTS

| 2203415 | 8/1972 | Fed. Rep. of Germany . |
| 2140265 | 1/1973 | France . |
| 2127653 | 4/1984 | United Kingdom . |
| 2131657 | 6/1984 | United Kingdom . |

OTHER PUBLICATIONS

Proceedings of the IEEE, vol. 68, No. 10, Oct. 1980, pp. 1299-1303, NY, US, C. D. Anderson et al, "An Undersea Communication System Using Fiberguide Cables", p. 1302.

Primary Examiner—Benedict V. Safourek
Attorney, Agent, or Firm—Sughrue, Mion, Zinn, Macpeak and Seas

[57] ABSTRACT

The method consists in momentarily replacing the data in a transmitted digital data stream by a remote signalling message which is built up from consecutive sequences, each of which is obtained by repeating a specific binary pattern chosen from a plurality of possible binary patterns which are generated from the second and fourth sub-harmonics of a clock signal at the bit rate of the digital stream, and from logical combinations thereof. FIG. 2 is a circuit diagram of a transmitter circuit for transmitting a remote signalling message. Said transmitter circuit is located in equipments on a very high data rate digital link, which equipments include a circuit (6') for detecting and handling alarms, and a circuit (3) for recovering the bit rate from the digital stream. Divide-by-two circuits (10, 14) and a logic gate (16) serve to generate three kinds of pattern from the recovered clock rate, namely: 0101, 0011, 1000. A sequencer (21) builds up sequences of patterns within a remote signalling message by means of a multiplexer (20) whose inputs are encoded with the message to be transmitted, a pattern generator selector circuit (11, 15, 16), and switching means (18) for inserting the remote signalling message instead of the digital stream.

5 Claims, 3 Drawing Figures

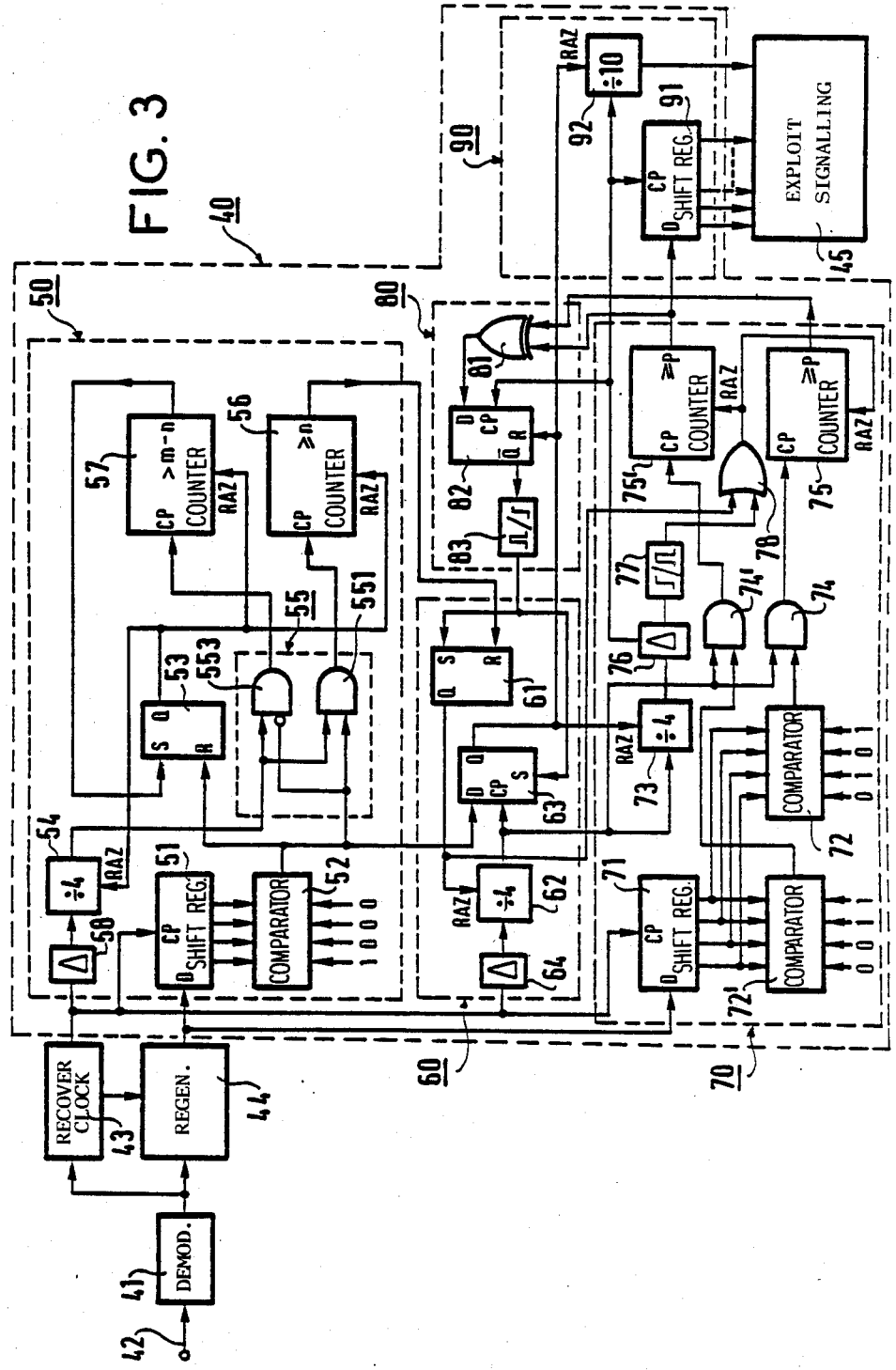

METHOD AND APPARATUS FOR REMOTE SIGNALLING BY SUBSTITUTING A MESSAGE FOR THE DATA CONVEYED BY A DIGITAL TRANSMISSION LINK

The present invention relates to remote surveillance of equipment distributed along a digital transmission link.

BACKGROUND OF THE INVENTION

In order to meet requirements for operating lifetime and reliability as needed by very long distance transmission links, it has become necessary to provide a degree of redundancy in optical fiber transmission systems, in particular concerning the laser diodes which are fitted in the repeaters. This redundancy is obtained by initially equipping each repeater with several spare laser diodes which are brought into operation one by one by a switching circuit. Such a configuration requires means for remotely controlling the repeater switching circuits from the line's terminal equipment, together with remote signalling means from each repeater for informing the terminal equipment on the state of the laser diodes in service.

U.S. Pat. No. 4,281,416 describes an optical fiber digital link fitted with remote control enabling the laser diode in service in each repeater to be replaced by a spare laser diode, together with remote signalling specific to each repeater enabling an alarm to be transmitted when the bias current of the laser diode in service exceeds a threshold. The remote control signal is constituted by a digital message which is of the same nature as the digital signal transmitted over the link, and which is inserted into the transmitted traffic by the remote surveillance terminal. This digital message is repeated consecutively several times in order to avoid spurious operation, and it is constituted by a portion which identifies the repeater concerned, and a portion which identifies which laser diode is to be put into service in that repeater. The remote signalling signal is a pattern constituted by a pseudo-random binary string whose initial value identifies the source repeater.

This remote signalling has the drawback of requiring each repeater to include a source of pseudo-random strings capable of operating at the digital signal bit rate which, in an optical fiber digital transmission system, is an extremely high rate which must be provided using ECL technology, and which therefore consumes a great deal of energy. This constitutes a significant increase in the total energy consumed by the repeater, and above all it constitutes a considerable increase in the heat which the repeater must be capable of dissipating.

The above-described prior art system also suffers from the drawback of interrupting the link for a period of time which is long enough to cause synchronization to be lost in the digital data stream hierarchy, which means that such signalling can only be used for transmitting major alarms.

Preferred implementations of the present invention avoid these drawbacks and provide remote signalling using a message which momentarily takes the place of the data in the digital stream conveyed by the link, and signalling requiring a minimum of very high speed circuits for generating the remote signalling messages, and avoiding disturbance to the digital stream and to processing thereof other than at the moments when the message is being transmitted.

SUMMARY OF THE INVENTION

The present invention provides a method of remote signalling by substituting a message for the data in a digital stream conveyed by a transmission link, the method consisting in transmitting the signalling by means of a digital message at the same data rate as the digital stream, which digital message is formed by consecutive sequences each of which is obtained by repeating a specific binary pattern selected from a plurality of possible binary patterns and generated by means of the second and fourth sub-harmonics of the clock signal at the digital stream data rate on the link, and logical combinations thereof, Advantageously, the remote surveillance message comprises an invariant prefix built up from sequences obtained from a first specific pattern, and a suffix built up from a varying combination of sequences obtained by means of two other specific patterns to encode remote surveillance data.

The manner in which the patterns are obtained from the second and fourth sub-harmonics of the clock signal at the data stream data rate, and the manner in which logical combinations thereof are obtained, require the remote signalling message to include at least one transition per group of four successive bits, which is ample for use with clock recovery circuits.

In order to distinguish the remote signalling message within the digital stream, advantage is taken of the lengths of the sequences and of their composition in order to obtain a message configuration which is illegal in the context of the redundant code which is used for line transmission in order to make error surveillance possible. The prefix sequence is generated with a limited digital sum code and using several repetitions of the pattern 1000 by a logical NOR combination of the second and fourth sub-harmonics of the clock signal at the digital stream rate in such a manner as to exceed the limit imposed on the current digital sum, whereas with an insertion bit code arrangements are made for the message as a whole to violate the law defining bit insertion.

Loss of synchronization in the digital stream hierarchy when the remote signalling message is inserted is avoided by ensuring that the inserted message is shorter than one sector in a frame in the highest level of the digital stream hierarchy.

The digital message is built up from such sequences at a speed which is less than that of the digital stream, thereby enabling the message to be built up using a less energy hungry technology, e.g. I²L or Schottky technology.

The present invention also provides apparatus for implementing the above-defined method.

BRIEF DESCRIPTION OF THE DRAWINGS

An embodiment of the invention is described by way of example with reference to the accompanying drawings, in which:

FIGS. 2 and 3 are respective circuit diagrams of a transmitter and a receiver for remote signalling messages in accordance with the invention.

MORE DETAILED DESCRIPTION

The remote signalling described below is applicable to a digital transmission link operating at 295.6 Mbits/s over optical fibers using a scrambled NRZ line code having a 24 B1P type parity bit and comprising a multiplex organized into 4.736 us frames each subdivided into seven sectors, thus conveying two digital streams at 140 Mbits/s which are themselves the result of fourth order digital multiplexing using a hierarchy in accordance with the G700 series of CCITT recommendations. The remote signalling is intended to serve not more than 256 equipments distributed along the link and to signal four types of anomaly per distributed equipment. The signalling system uses a message capable of taking up any one of 1024 possible values, with each message being constituted by twelve consecutive sequences.

The first two sequences are identical. They act as a prefix and they are each constituted by the pattern 1000 repeated four times over. The other ten sequences act as a suffix and each is constituted by a pattern which is repeated four times over, with the pattern 0101 being used to convey the binary value 0 and with the pattern 0011 being used to convey the binary value 1, thereby building up ten digits of a binary number capable of encoding 1024 possible values.

A remote signalling message built up in this way generates at least two parity violations in 24 B1 P code, thereby ensuring that the message cannot be imitated in the absence of errors, and also ensuring that the probability of imitation once in 25 years by a digital stream suffering from an error rate of $1.10^{-2}$ is less than $1.10^{-35}$. Remote signalling messages remain highly transparent to the digital stream clock rate since all messages ensure at least one transition per group of four bits. The disturbing effect of remote signalling messages on synchronization in the digital stream hierarchy is low and remains within tolerable limits since a message length of 192 bits at 295.6 Mbits/s gives a message duration of 649 ns which is less than the 677 ns duration of a frame sector in the highest level in the digital stream hierarchy.

Figure 1:
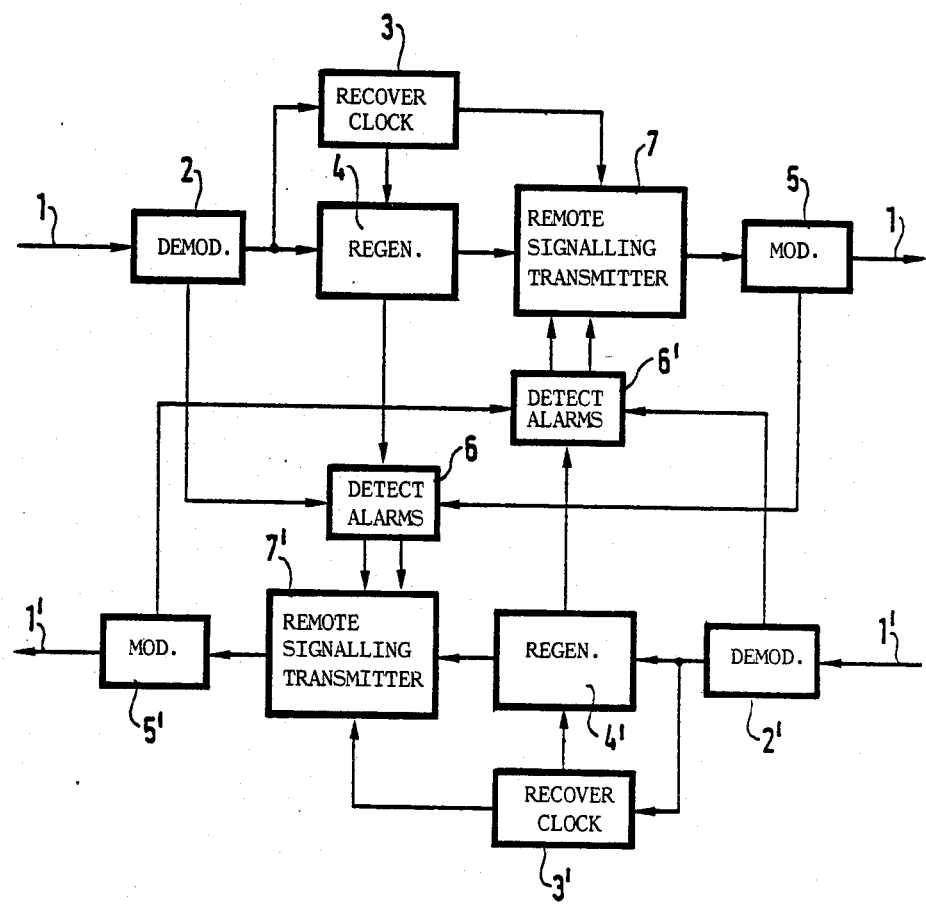
FIG. 1 is a block diagram showing how a circuit for transmitting remote signalling messages is inserted in a two-way repeater in an optical fiber digital transmission link.

FIG. 1 is a block diagram of a two-way repeater in a digital transmission link. Each path of the repeater is fitted with a circuit for transmitting remote signalling under the control of a circuit for detecting and handling alarms, which circuit monitors the other path through the repeater.

One of the paths regenerates optical signals conveyed by an optical fiber 1 in one direction and the other path regenerates optical signals conveyed by an optical fiber 1' in the other direction. In conventional manner, each path includes: an opto-electrical demodulator 2, 2' receiving the optical signal to be regenerated from the corresponding optical fiber 1, 1'; electronic pulse shaping circuits essentially constituted by a bit rate recovery circuit 3, 3' and a regenerator circuit 4, 4'; and an optical modulator 5, 5' which receives the regenerated signal and which re-inserts it into the optical fiber 1, 1'. Each path is additionally fitted with a circuit for detecting and handling alarms 6, 6' which monitors correct operation of the above-mentioned components, and which is capable of transmitting four types of alarm. Finally, each path is fitted with a remote signalling transmitter circuit 7, 7' which is inserted between the regenerator circuit 4, 4' and the optical modulator 5, 5', and which is controlled both by the bit-rate recovery circuit of the same path 3, 3' and by the circuit 6', 6 for detecting and handling alarms of the other path.

When an anomaly is detected on one of the paths, the circuit for detecting and handling alarms 6, 6' causes a remote signalling message to be transmitted over the other path towards the terminal which is situated upstream from the detected anomaly on the path suffering from said anomaly, thereby allowing said terminal to take appropriate action such as diverting traffic or remotely controlling a structural modification, e.g. changing over the laser diode in operation.

Figure 2:
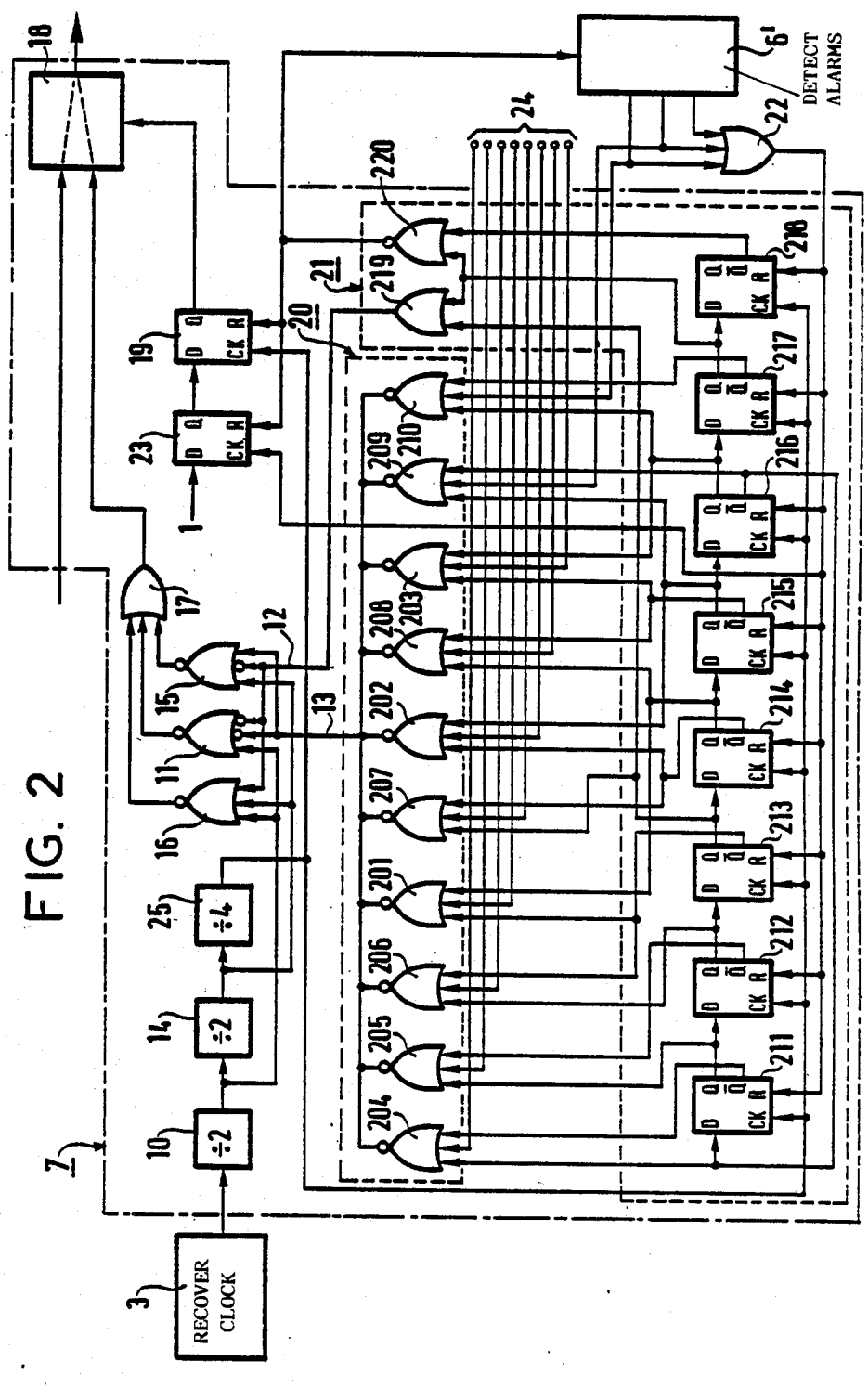

FIG. 2 is a circuit diagram of an embodiment of one of the remote signalling transmitter circuits. This transmitter circuit, 7, comprises:

a first pattern generator for repeatedly generating 0101 patterns of suffix sequences and constituted by a divide-by-two circuit 10 connected to the output of the bit rate recovery circuit 3;

a second pattern generator for repeatedly generating 0011 patterns of suffix sequences and constituted by a divide-by-two circuit 14 connected to the output of the divide-by-two circuit 10 of the first generator for repeatedly generating the pattern 0101;

a third pattern generator for repeatedly generating 1000 patterns of prefix sequences, said third pattern generator being constituted by a logic NOR gate 16 having three non-inverting inputs, two of which are connected to respective outputs from the divide-by-two circuits 10 and 14 in the first and second pattern generators in order to perform the logic NOR function between said patterns 0101 and 0011 and thereby obtain the pattern 1000;

a circuit for selecting one of the three pattern generators, said circuit comprising two three-input logic NOR gates 11 and 15, the NOR gate 11 being connected to the output from the first pattern generator as constituted by the divide-by-two circuit 10, and the other NOR gate 15 being disposed at the output from the second pattern generator as constituted by the divide-by-two circuit 14, said selection circuit further comprising a third input to said logic NOR gate 16 which constitutes the third pattern generator and a three-input logic OR gate 17 which is connected to the outputs from the above-mentioned logic NOR gates 11, 15, and 16, said selection circuit having a first control input 12 which is connected to respective inverting inputs of the NOR gates 11 and 15 and to a non-inverting input of the NOR gate 16 thereby enabling a prefix pattern or a suffix pattern to be selected and locking the outputs from the unwanted pattern generators to logic level 0, and a second control input 13 connected to an inverting input of the NOR gate 11 and to a non-inverting input of the NOR gate 15 thereby enabling one of the suffix patterns to be selected and blocking the output from the other suffix pattern generator to logic level 0;

switch means constituted by a two-input multiplexer 18 having one input connected to the output from the logic OR gate 17 which constitutes the output from the selection circuit and having its other input connected to the output from the digital stream generator circuit (4, FIG. 1), and having its output connected to the optical modulator (5, FIG. 1);

a ten-input multiplexer 20 having two inputs controlled by the circuit 6' for detecting and handling alarms, and having eight inputs 24 connected to logic levels which encode the identification number of the repeater in question, the output from said multiplexer controlling suffix pattern selection by means of the control input 13 to the selection circuit;

a sequencer 21 which is triggered by the circuit 6' for detecting and handling alarms, and which driven at a rate equal to one-sixteenth of the digital stream bit rate via a divide-by-four circuit 25 connected to the output from the divide-by-two circuits 10 and 14, said sequencer ensuring the proper arrangement of the pattern sequences in a remote signalling message by controlling selection of the prefix pattern 1000 or of one of the suffix patterns 0101 and 0011 by means of the first control input 12 to the selection circuit, and by selecting the appropriate one of the suffix patterns by addressing the ten-input multiplexer 20, thereby building up a remote signalling message, said sequencer also serving to generate a signal indicative of the end of a remote signalling message;

a bistable circuit 19 which is triggered by the circuit 6' for detecting and handling alarms via a logic OR gate 22 and circuit 23 for synchronizing said triggering with the sequencer 21, which is reset to zero by the sequencer 21 by means of its end of remote signalling signal, and which controls the addressing of the switch means 18 in such a manner that when the bistable is in its rest position the signal from the digital stream regenerator circuit is directed to the optical modulator, and when the bistable is in its working position, the signal from the pattern generator selector circuit is applied to the optical modulator.

The circuit 23 for synchronizing the triggering of the bistable 19 is constituted by a D type bistable whose data input is set to logic level 1 and whose clock input is connected to the output from the logic OR gate 22, and which is reset to zero by the end of remote signalling signal generated by the sequencer 21. The bistable circuit 19 is likewise constituted by a D type bistable, whose data input is connected to the Q output from the bistable 23, whose clock input is connected to receive the clock signal at one-sixteenth of the digital stream data rate as delivered by the divide-by-four circuit 25, and whose reset to zero input is connected to be reset to zero by the end of remote signalling signal.

The sequencer 21 is mainly constituted by an eight stage shift register having stages 211 to 218 which receive the clock signal at one-sixteenth of the digital data stream rate as delivered by the divide-by-four circuit 25 which is connected downstream from the divide-by-two circuits 10 and 14. The shift register has the input to its first stage looped to receive the inverting output Q from its sixth stage, and has its overall reset to zero input controlled by the circuit 6' for detecting and handling alarms via the logic OR gate 22 which inhibits the shift register in the absence of an alarm. When the shift register is enabled a pattern comprising six logic zeros followed by six logic ones is shifted through the first six stages of the shift register.

When the overall reset to zero input is released by the circuit 6' for detecting and handling alarms, a string of six consecutive logic level ones progressively replaces the logic level zeros which are initially available at the outputs from the various stages. A two-input logic OR gate 219 is connected to the outputs from the third and seventh stages of the shift register and has its output connected to the first control input 12 of the circuit for selecting the pattern generators. The output from the logic gate 219 thus prevents selection of the suffix patterns 0101 or 0011 during the first two shifts of the shift register and thereby causes the first two transmitted sequences of a remote signalling message to be constituted by the prefix pattern 1000. After the first two shifts, the output from the OR gate 219 changes state, thereby preventing transmission of the prefix pattern and enabling transmission of one or other of the suffix patterns. The use of the output from the seventh stage avoids the suffix sequence pattern generators from being re-inhibited when the string of logic level zeros reappears in the inlet stages of the shift register while the remote signalling message is still being transmitted. A two-input logic NOR gate 220 has one input connected to the eighth stage 218 of the shift register and has its other input connected to the inverting Q output thereof and serves to detect the end of the string of logic level ones at the input to the eighth stage, which is interpreted as the end of the remote signalling message and is used to reset the circuit 6' for detecting and handling alarms, and for returning the bistable to 23 and 19 to their rest condition so that the switching means 18 returns to forwarding digital data instead of inserting remote signalling patterns.

The ten input multiplexer 20 is constituted by a battery of logic NOR gates 201 to 210 having open collector outputs which are connected together to constitute a "wired-OR" output which is connected to the second control input 13 of the selection circuit for selecting one or other of the suffix sequence pattern generators. The logic gates 201 to 210 each have three inputs, two of which constitute selection inputs which are connected to various levels of the shift register in the sequencer 21. These gates are addressed one-by-one in the order of their reference numerals. The gates 201, 202, and 203 are associated respectively with the fourth, fifth, and sixth stages of the shift register and each of them has one of its selection inputs connected to receive the inverse of the data input to its associated shift register stage and the other of its selection inputs connected to receive the non-inverted data output from its associated stage. As a result, these three states are successively opened when the beginning of the string of logic level ones appears at the inputs to the associated stages. Similarly, the logic gates 204 to 210 are associated with respective ones of the first seven stages of the shift register, but these gates have one of their selection inputs connected to receive the non-inverting data input to the associated stage and the other of their selection inputs connected to receive the inverting data output from the associated stage. As a result, these latter seven gates are opened in succession as the end of the string of logic level ones appears as the inputs of their associated stages.

When there is no alarm, the circuit 6' for detecting and handling alarms holds all three of its outputs to logic level zero which causes a logic level zero to appear at the output from the logic OR gate 22, thereby holding all of the stages of the shift register in the sequencer 21 to zero, and thus holding the bistable circuit 19 in its rest state so that the switching means 18 keeps the input to the optical modulator in connection with the output from the digital stream regenerator circuit.

When an alarm appears, one of the outputs from the circuit 6' for detecting and handling alarms changes to logic level 1, which logic level propagates through the logic OR gate 22 and releases the stages of the shift register in the sequencer 21, further, the rising edge said logic level 1 activates the bistable circuit 23 for synchronizing triggering and thus prepares the bistable circuit 19 to be triggered in synchronization with the first shift of the shift register by the clock signal at one-sixteenth of the digital stream bit rate as delivered by the divider circuit 25. The bistable circuit 19 causes the switching means 18 to replace the digital data stream by the signal from one of the pattern generators for repetitively generating one of the patterns 1000, 0101, or 0011. From the first to the third shift of the register, the output signal from the 1000 pattern generator is selected, and from the third to the thirteenth shift, the output signal from one or other of the generators for generating the patterns 0101 and 0011 is selected as a function of the logic levels set at the inputs to the multiplexer 20. On the thirteenth shift of the register, the logic gate 220 generates an end-of-message signal which resets the circuit 6' for detecting and handling alarms and which switches over the bistable circuits 23 and 19 to their rest positions, thereby re-establishing the connection between the output from the circuit for regenerating the digital stream and the input to the optical modulator.

A remote signalling message in respect of the same alarm may optionally be repeated by remotely controlling the circuit 6' for detecting and handling alarms.

It may be observed that only a small number of components need to be made from a very high speed technology of the ECL type which is compatible with a bit rate of 295.6 Mbits/s, but which has a high level of energy consumption. In particular, the components which need to be constituted by high speed circuits are restricted to the repetitive pattern generators which are constituted by divide-by-two circuits (e.g. JK type bistables) together with logic OR or NOR gates, and the switch means which may also be constituted by logic OR or NOR gates. The remainder of the components operate at a reduced bit rate of 18.475 Mbits/s which can be handled by slower I²L or Schottky type technology which consumes much less energy.

FIG. 3 is a circuit diagram of an embodiment of a remote signalling receiver circuit 40 shown in its environment where it is connected within cable terminal equipment between a circuit 45 for making use of the signalling, and receive path terminating equipment constituted by an opto-electronic demodulator 41 to which an optical fiber 42 conveying the incoming digital stream is connected, together with electronic signal pulse shaping circuits constituted by a bit rate recovery circuit 43 and a regenerator circuit 44, which circuits are not described in greater detail since they lie outside the scope of the invention.

The remote signalling receiver circuit 40 essentially comprises a prefix recognizer circuit 50 which triggers a circuit 60 for detecting the end of the prefix and a circuit 70 for identifying and discriminating between the sequences of a suffix, which circuit 70 is controlled by the end of prefix detector circuit 60 and is followed by an end of suffix detector circuit 80 which causes the end of prefix detector circuit 60 to return to rest, and is followed by a sample and store circuit 90 which records the bits of the remote signalling message while they are being received.

The prefix recognizer circuit 50 recognizes the appearance of the prefix of a remote signalling message in the received digital stream and restores the pattern boundaries in said message. In order to do this, it adopts a pattern rate which coincides with the first detected 1000 pattern, and it verifies that this pattern forms a part of a string of n 1000 patterns out of m patterns, i.e. out of a succession of binary bits in the digital stream which begins with the pattern 1000 and which has any length of not more than m patterns, where m is an integer which is less than or equal to the number of 1000 patterns which appear in a prefix. n is an integer which is less than m so as to enable a prefix to be recognized even in the presence of tranmission errors. In this case, m is taken to be equal to eight which is the number of 1000 patterns appearing in each of the prefix sequences, and n is taken to be equal to seven. The prefix recognition circuit 50 comprises:

a four-stage shift register 51 having a serial input and parallel outputs, which shift register has its data input connected to receive the digital stream after it has been shaped by the regenerator circuit 44, and it has its clock input connected to receive the clock signal as reconstituted by the bit rate recovery circuit 43;

a comparator 52 for comparing two four-bit binary numbers having one input hardwired to logical levels 1000 and having its other input connected to the parallel outputs of the shift register 51;

a trigger circuit constituted by an RS bistable 53 having its R input connected to the output from the comparator 52;

a pattern rate generator constituted by a divide-by-four counter circuit 54 which operates at the bit rate as supplied by the bit rate recovery circuit 43 and which delivers an asymmetrical signal having a logical level 1 during a state 1 and a logical level 0 during three other states and having positive going transitions which are synchronized, with a small dalay, on the instants at which the first pattern is detected by the comparator 52 by virtue of its reset to zero input being controlled by the Q output from the RS bistable 53 of the trigger circuit, with a delay line 58 acting on the bit rate signal applied to the input of the divide-by-four circuit 54 in order to compensate for the divider delay relative to the transition in the bit rate signal delivered by the recovery circuit 43 which caused the divider to operate;

a coincidence detector 55 sampling the output from the comparator 52 at the rate generated by the pattern rate generator in order to apply instructions on two distinct outputs for counting the presence or the absence of a prefix sequence pattern, and including a first logic AND gate 551 having two non-inverting inputs, which AND gate delivers the pattern-presence count instructions in the form of positive transitions and has one of its inputs connected to the output from the comparator 52 and the other of its inputs connected to the output from the divide-by-four circuit 54 of the pattern rate generator, and a second logic AND gate 553 having two inputs, one of which is an inverting input and the other of which is a non-inverting input, said AND gate 553 delivering pattern-absence count instructins in the form of positive transitions and having its inverting input connected to the output from the comparator 52 and its non-inverting input connected to the output from the divide-by-four circuit 54 of the pattern rate generator;

an n counter 56 having a reset to zero input controlled by the Q output from the RS bistable 53 of the trigger circuit, a count input responsive to positive transitions and connected to the output for pattern-presence count instructions from the coincidence detector 55, and an overflow output which passes to logic level 1 once its count has reached or exceeded n, which output constitutes the output from the prefix recognition circuit; and an m-n counter 57 having a reset to zero input controlled by the Q output from the RS bistable 53 of the trigger circuit, a count input responsive to positive transitions connected to the output for pattern-absence count instructions from the coincidence detector 55, and an overflow output which goes to logic level 1 when its count exceeds m-n, and which controls the S input to the RS bistable 53 of the trigger circuit.

In the absence of a 1000 pattern in the bits of the digital stream being repeated over a length which is greater than m-n patterns, the trigger circuit constituted by the RS bistable 53 is at rest, with its Q output delivering a logic level 1 which holds the divide-by-four circuit 54 of the pattern rate generator in a fixed state, and which consequently inhibits the n and the m-n counters 56 and 57 for counting pattern presences and absences.

As soon as a 1000 pattern appears in the digital stream delivered by the regenerator circuit 44, the comparator 52 detects the pattern and in response it delivers a positive pulse which sets the RS bistable 53 of the trigger circuit so that its Q output goes to logic level zero, thereby enabling the n and m-n counters 56 and 57 for counting pattern presences and absences, and also enabling the divide-by-four circuit 54 of the pattern rate generator whose positive going transitions are thus synchronized, with a slight delay, on the instants at which the initial 1000 pattern was detected by the comparator 52. Said positive pulse is also applied to the coincidence detector 55 which takes it into account when generating instructions for counting pattern presences and intended for the n counter 56. At each subsequent positive transition in the output signal from the divide-by-four circuit 54 of the pattern rate generator, the coincidence detector 55 takes account of the presence or the absence of a new positive pulse at the output from the comparator 52 in order to generate an instruction for counting the presence or the absence of the pattern for use by the n counter 56 or by the m-n counter 57.

If the m-n counter 57 overflows, then the number of absences of pattern recognition in the prefix sequence is greater than m-n, and consequently a prefix configuration cannot be present. As a result, the RS bistable 53 of the trigger circuit is reset, thereby returning to zero the divide-by-four circuit 54 of the pattern rate generator and the n and m-n counters 56 and 57.

If the n counter 56 overflows (which can only happen so long as the m-n counter 57 does not overflow), then a prefix configuration has been recognized and the overflow signal constitutes the output signal from the prefix recognition circuit 50.

The end of prefix detector circuit 60 comprises:

a trigger circuit comprising an RS bistable 61 having its R input connected to the overflow output from the n counter 56 of the prefix recognition circuit 50 and having its S input connected to the output from the end of suffix detector circuit 80;

a pattern rate generator constituted by a divide-by-four counter circuit 62 which operates at the clock rate supplied by the bit rate recovery circuit 43 and which delivers an asymmetrical signal having logic level 1 during a one state and logic level 0 during the next three states, and which has positive transitions that are synchronized, after a small delay, with the instant at which the first pattern of the prefix sequence is detected by the comparator 52 by virtue of its reset to zero input being controlled by the Q output of the trigger circuit RS bistable 61, with a delay line 64 acting on the bit rate signal applied to the input of the divide-by-four circuit 62 to compensate for the delay of the divider circuit 62 relative to the transition in the bit rate signal from the recovery circuit 43 which caused the circuit 62 to operate; and a D type bistable 63 which has its data input D connected to the output from the comparator 52 of the prefix recognition circuit 50, which has its clock input CP connected to the output from the divide-by-four circuit 62, and which has its set to level one input S connected to the output from the end of suffix detector circuit 80, with its Q output constituting the output from the end of prefix detector circuit 60.

The trigger RS bistable 61 has its R and S inputs at logic level 0 except when the prefix recognition circuit 50 detects a prefix in the received digital stream and causes the R input to go to logic level 1 while leaving its S input at logic level 0, and when the end of suffix detector circuit 80 detects the end of a remote signalling message and applies a positive pulse on its S input, while leaving its R input at logic level 0.

In the absence of a remote signalling message in the received digital stream, the trigger circuit RS bistable 61 has its R and S inputs at logic level 0 and its Q output retains the logic level 1 which it acquired at the end of the last received remote signalling message or at the end of a transition period during which the equipment is put into service by a pulse from the end of suffix detector circuit 80. This logic level 1 holds the divide-by-four circuit 62 of pattern rate generator to zero, and removes the clock signal from the D type bistable 63 which therefore retains logic level 1 at its Q output.

In the presence of a prefix configuration starting a remote signalling message, the n counter 56 in the prefix recognizer circuit 50 overflows at the n-th pattern recognized in the prefix sequence by the comparator 52, and applies a logic level 1 to the R input of the trigger circuit RS bistable 61 which then changes state so that its Q output goes to logic level 0 thus releasing the divide-by-four circuit 62 of the pattern rate generator so that the positive transitions in the signal which it delivers are then synchronized in the same way as the signal from the pattern rate generator circuit in the prefix recognition circuit 50, i.e. with a slight delay relative to the instant at which the comparator 52 detected the first pattern in the prefix sequence. The D type bistable 63 samples the output from the comparator 52 at the rate supplied by the divide-by-four circuit 62. Its Q output remains at logic level 1 so long as the comparator 52 recognizes prefix patterns at said rate, and it changes over to logic level 0 when recognition ceases.

The circuit 70 for identifying and discriminating the suffix sequence comprises:

a four stage shift register 71 (which may be constituted by the same shift register 51 as is used by the prefix recognition circuit) which has a data input connected to receive the shaped digital stream from the regenerator circuit 44 and which has a clock input connected to receive the clock signal provided by the bit rate recovery circuit 43;

a first comparator 72 for comparing two four-bit binary numbers, having a first input wired to receive logic levels 0101, and having a second input connected to receive the parallel output from the shift register 71;

a second comparator 72' for comparing two four-bit binary numbers, having a first input wired to receive logic levels 0011, and having a second input connected to receive the parallel output from the shift register 71;

a sequence rate generator constituted by a divide-by-four counter circuit 73 which operates at the rate at which received patterns are delivered by the divide-by-four circuit 62 in the end of prefix detector 60 and which provides an asymmetrical signal which is at logic level 1 during state 3 and at logic level 0 during the other three states, said signal having positive transitions which are synchronized on the third positive transition in the signal provided by the divide-by-four circuit 62 of the pattern rate generator in the end of prefix detector circuit 60 immediately following the instant at which the end of the prefix is detected by virtue of its reset to zero input being controlled by the Q output from the D type bistable 63 of the end of prefix detector circuit 60;

a first coincidence detector which samples the output from the first comparator 72 in time with the positive transitions from the divide-by-four circuit 62 of the pattern rate generator in the end of prefix detector circuit 60, and which is constituted by a two-input logic AND gate 74 having one input connected to the output of the first comparator 72 and having its other input connected to the output of the divide-by-four circuit 62 in the end of prefix detector circuit 60;

a second coincidence detector which samples the output from the first comparator 72' in time with the positive transitions from the divide-by-four circuit 62 of the pattern rate generator in the end of prefix detector circuit 60, and which is constituted by a two-input logic AND gate 74' having one input connected to the output of the first comparator 72' and having its other input connected to the output of the divide-by-four circuit 62 in the end of prefix detector circuit 60;

a first p counter 75, where p is advantageously equal to two, having a reset to zero input controlled via a logic OR gate 78 either by the signal on the Q output of the RS bistable 61 in the end of prefix detector circuit 60 or else by the positive transitions in the output from the divide-by-four circuit 73 of the sequence rate generator via a delay line 76 and a rising edge detector circuit 77, having a count input which is responsive to rising edges connected to the output from the logic gate 74 which constituted the first coincidence detector, and having an overflow output which changes to logic level 1 when its count has reached or exceeds p, and which constitutes the output for indicating that a suffix sequence having the pattern 0101 has been detected; and a second p counter 75' identical to the first counter 75 having a count input connected to the output from the logic AND gate 74' which constitutes the second coincidence detector, and having an overflow output which constitutes the output for indicating that a suffix sequence having the pattern 0011 has been detected, and a reset to zero input connected to the output from the logic OR gate 78.

So long as a remote signalling message is not being received, the circuit for identifying and discriminating suffix sequences 70 is inhibited at its coincidence detectors by the logic level 0 which is present at the output from the divide-by-four circuit 62 which is itself held to zero in the pattern rate generator of the end of prefix detector circuit 60, similarly its counters 75 and 75' are held to zero by the RS bistable 61 of the end of prefix detector circuit 60 and its divide-by-four circuit 73 which constitutes its sequence rate generator is held to zero by the D type bistable 63 of the end of prefix detector circuit 60.

While a message is being received, the circuit for identifying and discriminating suffix suquences 70 is initially enabled at its counters 75 and 75' and at its coincidence detectors by the prefix recognition circuit 50 which resets the RS bistable 561 to zero thereby releasing the divide-by-four circuit 62 as soon as a prefix has been detected and thus initiates a search for suffix sequence patterns 0101 and 0011 by the coincidence detectors sampling the signals at the outputs from the comparators 72 and 72' at the rate of the signal provided by the divide-by-four circuit 62 of the pattern rate generator in the circuit 60. The circuit 70 is then further enabled at its divide-by-four circuit 73 which constitutes its own sequence rate generator by the D type bistable 63 of the end of prefix detector circuit changing state at the end of the prefix, thus resetting to zero the counters 75 and 75' at the end of each suffix sequence.

The end of suffix detector circuit 80 comprises:

a logic exclusive-OR gate 81 having two inputs which are respectively connected to the outputs from the counters 75 and 75' of the circuit 70 for identifying and discriminating suffix sequences;

a D type bistable 82 which has its D input connected to the output from the logic exclusive-OR gate 81, which has its clock input CP connected to an intermediate tap on the delay line 74 connected to the output from the divide-by-four circuit 73 of the sequence rate generator in the circuit 70 for identifying and discriminating suffix sequences, and which has its reset to zero input R connected to a Q output of the D type bistable 73 of the end of prefix detector circuit 60; and a circuit for detecting rising edges 83 which is connected to the inverse Q output from the D type bistable 82 and which delivers the output signal from the end of suffix detector circuit 80.

The D type bistable 82 of the end of suffix detector circuit is held to zero while a remote signalling message is not being received and while a remote signalling message prefix is being received by the D type bistable 63 of the end of prefix detector circuit.

As soon as the end of the prefix has been detected, the D type bistable 82 is released, and on each rising edge of the signal from the divide-by-four circuit 73 of the sequence rate generator in the circuit 70 for identifying and discriminating suffix sequences, it samples the overflow outputs from the counter 75 and 75' thereof, passing to logic level 1 and remaining there so long as one or other of the suffix sequences is recognized, and returning to zero as soon as neither suffix is recognized. The D type bistable 82 going to logic level 1 which occurs when the beginning of a remote signalling message suffix is recognized has no effect on the circuit 83 for detecting rising edges connected to its inverting output Q. However, when it returns to zero at the end of a suffix sequence, the circuit 83 for detecting rising edges generates a positive pulse which reinitializes the end of prefix detector circuit and which consequently inhibits the circuit 70 for identifying and discriminating suffix sequences.

The sample and store circuit 90 which records the value of the remote signalling message as it is being received comprises:

a ten-stage shift register 91 having a serial input and parallel outputs, which has its data input connected to receive the signal on the overflow output from the counter 75', and which has its clock input connected to the intermediate tap on the delay line 76 to receive the slightly delayed signal from the divide-by-four circuit 73 of the sequence rate generator in the circuit 70 for identifying and discriminating suffix sequences; and a divide-by-ten circuit 92 which is clocked, after a slight delay, at the rate of the divide-by-four circuit 73 of the sequence rate generator in the circuit 70 for identifying and discriminating suffix sequences as made available at the intermediate tap on the delay line 76, and which is reset to zero by the Q output of the D type bistable 63 of the end of prefix detector circuit 60.

So long as a remote signalling message suffix is not being received, the shift register 91 remains unmoved since it does not receive a clock signal. As soon as a remote signalling message suffix is being received, the shift register samples the signal at the overflow output from the counter 75' which passes to logic level 1 each time that a sequence having the pattern 0011 is detected, and which thus corresponds (as mentioned at the beginning of the description) to a binary 1 value for digits in the binary number encoding the remote signalling message. The samples shift along the shift register 91 on each rising edge in the signal from the divide-by-four circuit 73, after a slight delay in order to leave the counter 75' sufficient time to take into account the signal at the output from the gate 74'. The entire register is first filled in this manner, and the divide-by-ten circuit 92 then generates a signal informing the circuit 45 for exploiting the signalling that it may take account of the binary number made available to it on the parallel outputs from the shift register 91.

There are several circuits in the receiver circuit which operate at a high data rate which therefore require the use of energy hungry technology. However, this does not matter since there are generally very few circuits in any given digital link which exploit remote signalling, and it is unusual for such circuits to be remotely powered. This is in contrast to transmitters of remote signalling which are numerous and which are generally remotely powered.

We claim:

1. A remote signalling method for substituting a message for data in a digital stream conveyed by a transmission link said method comprising the following steps:
    obtaining a first sequence from a second sub-harmonic of a clock signal recovered from the digital stream, the first sequence being constituted by a repeated binary pattern of alternating ones and zeros;
    obtaining a second sequence from the fourth sub-harmonic of the recovered clock signal, said second sequence being constituted by a repeated binary pattern of alternating pairs of ones and zeros;
    obtaining a third sequence by logically combining the second and fourth sub-harmonics of the recovered clock signal of the digital stream;
    building up said message from consecutive ones of said first, second, and third sequences, all of said sequences having identical duration; and
    transmitting said message at the same bit rate as the digital stream, in place of the digital stream.

2. A method according to claim 1, wherein said step of building up said message comprises the steps of obtaining an invariant prefix constituted by one of the three kinds of sequence, and obtaining a suffix constituted by the other two kinds of sequence, wherein the step of obtaining the suffix includes the step of encoding remote signalling data in accordance with a specific combination of said other two kinds of sequence.

3. A remote signalling apparatus for conveying a message which is substituted for data in a digital stream conveyed by a digital link, including at least first means comprising a circuit for detecting and handling alarms and a circuit for recovering the bit rate from the digital stream, said apparatus further comprising at least one transmitter circuit, located in said first means, for transmitting a remote signalling message, said transmitter circuit comprising:
    a first four-bit binary pattern generator comprising a divide-by-two circuit operating on the clock signal delivered by a bit rate recovery circuit;
    a second four-bit binary pattern generator comprising a divide-by-two circuit operating on the output signal from said first binary pattern generator;
    a third four-bit binary pattern generator comprising a logic gate for logically combining the output signals from said first and second binary pattern generators;
    a selector circuit connected to the outputs from said three binary pattern generators for selecting one of said binary patterns, and having first and second binary control inputs;
    switch means for enabling the signal from said selector circuit to be momentarily inserted in the place of the digital data stream conveyed by said digital link;
    a multiplexer having respective inputs connected to logic levels which encode remote signalling data, and having an output connected to control said second control input of said selector circuit;
    a sequencer which is triggered by said circuit for detecting and handling alarms, and which is clocked at a rate equal to a sub-multiple of one-fourth of the rate of the clock signal delivered by the bit rate recovery circuit, said sequencer being connected to control the addressing of said multiplexer and said first control input of said selector circuit, thereby serving to build up the sequences within a remote signalling message, said sequencer being further connected to generate an end of remote signalling signal; and
    a bistable circuit triggered by said circuit for detecting and handling alarms and returned to a rest condition by said sequencer by means of its end of remote signalling signal, said bistable circuit controlling the addressing of said switching means in such a manner as to cause the output signal from said pattern generator selector circuit to be inserted into said digital stream while said bistable circuit is in its triggered state.

4. A remote signalling apparatus as claimed in claim 3, further including at least second means comprising a circuit for exploiting remote signalling, a circuit for recovering the bit rate from the digital stream, and at least one message receiver circuit, said second means further comprising:
    a prefix recognition circuit to which said digital stream conveyed by the digital link is applied;
    an end of prefix detector circuit triggered by said prefix recognition circuit;
    a circuit for identifying and discriminating suffix sequences, said circuit receiving the digital stream conveyed by the digital link and being put into action under the control of the end of prefix detector circuit;
    an end of suffix detector circuit placed after the circuit for identifying and discriminating suffix sequences and controlling re-initialization of the end of prefix detector circuit; and a sample and store circuit placed after the circuit for identifying and discriminating suffix sequences, said sample and store circuit storing the bits of the remote signalling message while said message is being received and decoded by said circuit for identifying and discriminating fixed sequences.

5. A remote signalling apparatus as claimed in claim 4, wherein said prefix recognition circuit comprises a circuit for recognizing n prefix sequence patterns out of a possible m patterns, said recognizing circuit comprising:

a serial-input/parallel-output shift register for receiving the digital data stream conveyed by the digital link, clocked by the clock signal generated by said circuit for recovering the bit rate, and delivering binary words at its parallel output which are equal in length to the length of a pattern;

a comparator for comparing two pattern-length binary numbers, one of said numbers being hand-wired and identical to a prefix sequence pattern, and the other being delivered by the parallel output of the shift register;

a trigger circuit activated by said comparator when said two pattern-length binary numbers are identical;

a pattern rate generator constituted by a divider operating on the signal from said bit rate recovery circuit and held in a zero state by said trigger circuit while said trigger circuit is in its rest state;

a coincidence detector connected to the output from the comparator and to the pattern rate generator and having two distinct outputs on which its delivers respective instructions for counting the presence and for counting the absence of a pattern;

a n counter connected to count said pattern presence count instructions as delivered by said coincidence detector, said n counter being held to a zero state by said trigger circuit while said trigger circuit is in its rest state, and delivering a prefix detection signal whenever its count reaches or exceeds n; and an m-n counter connected to count said pattern absence count instructions delivered by said coincidence detector, said m-n detector being held in a zero state by said trigger circuit while said trigger circuit is in its rest state, and delivering a signal for returning said trigger circuit to its rest state whenever its count exceeds m-n.

* * * * *